Feb. 11, 1930.
C. D. EMOFF
1,746,640
DECOY OF COLLAPSIBLE TYPE
Filed July 14, 1928
2 Sheets-Sheet 1
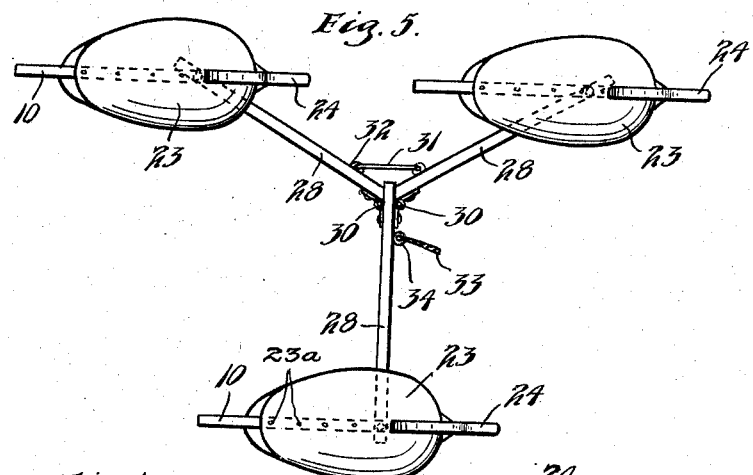
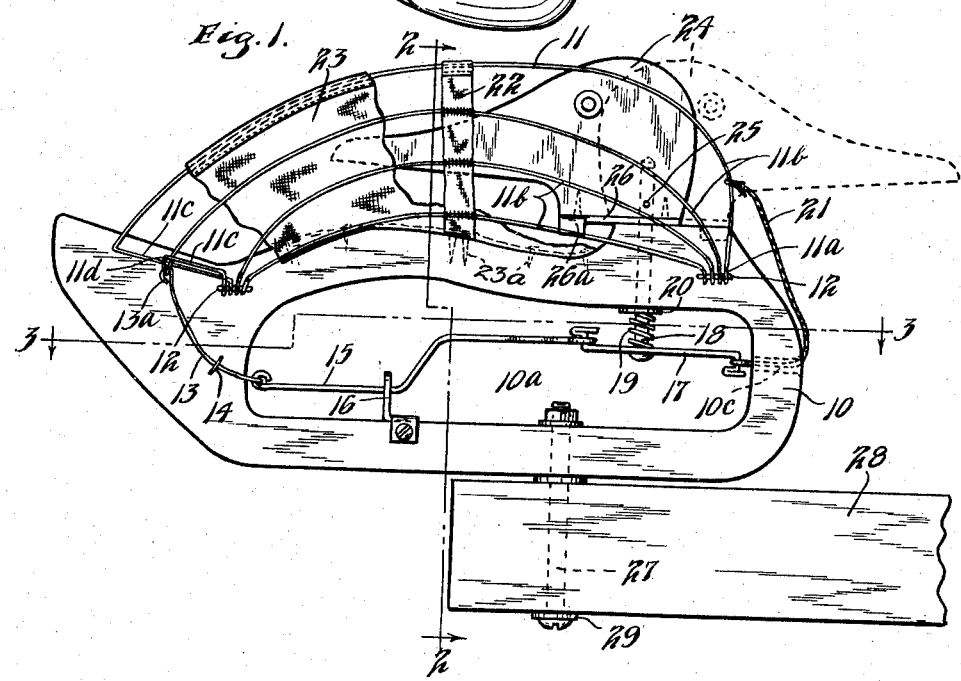
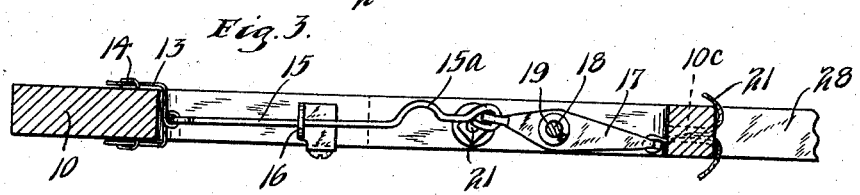
INVENTOR.
CHRIST D. EMOFF.
BY HIS ATTORNEYS.

Feb. 11, 1930.  C. D. EMOFF  1,746,640
DECOY OF COLLAPSIBLE TYPE
Filed July 14, 1928   2 Sheets-Sheet 2
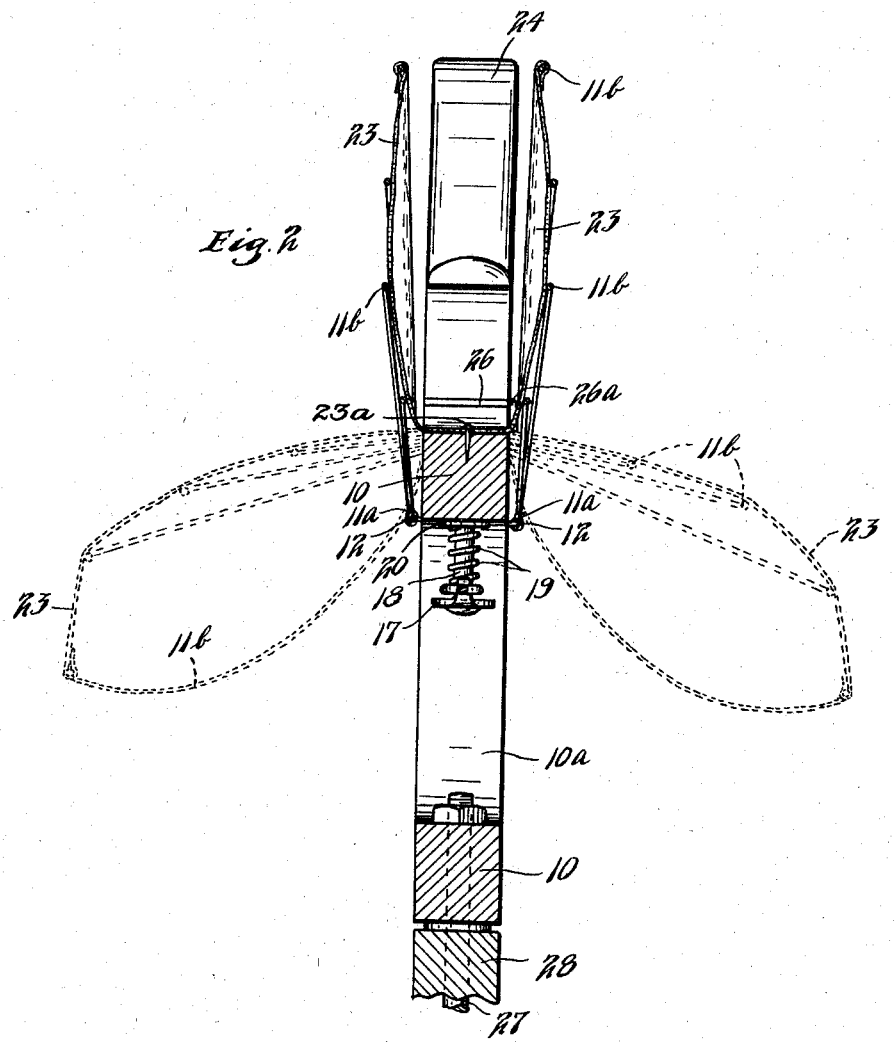
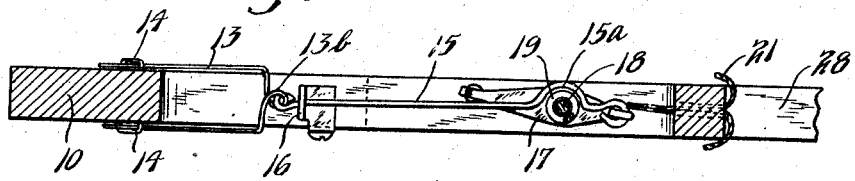
INVENTOR.
CHRIST D. EMOFF.
BY HIS ATTORNEYS.

Patented Feb. 11, 1930

1,746,640

UNITED STATES PATENT OFFICE

CHRIST D. EMOFF, OF MINNEAPOLIS, MINNESOTA

DECOY OF COLLAPSIBLE TYPE

Application filed July 14, 1928. Serial No. 292,645.

This invention relates to a decoy and particularly to a decoy for fowls, such as wild duck or other wild fowl. It is now the common practice for duck hunters to have a certain number of decoys which are placed on the water to attract the wild birds. It is desirable to have a decoy which is light in weight and which will not take up a great deal of room and one which can be collapsed and packed into a comparatively small space. The solid decoys simulating the wild fowl are quite bulky, often heavy and apt to become broken while being transported.

It is an object of this invention, therefore to provide a decoy of simple construction, one which is light in weight and which can be collapsed into a small space.

It is a further object of the invention to provide a decoy having a central rigid body portion to which are pivoted open work fabric covered side portions, means being provided to swing these side portions to operative position and upward to inoperative position in the plane of the central portion so that the decoy can be packed in flat condition.

It is still another object of the invention to provide a decoy fowl having a central body portion, to the sides of which are pivoted fabric covered portions, a portion of the fowl, such as the head being movable inwardly and connected to the side portions so as to swing the same to operative position to form the shape of the fowl and to inoperative flat position.

These and other objects and advantages of the invention will be fully set forth in the following description made in connection with the accompanying drawings, in which like reference characters refer to similar parts throughout the several views and in which, Fig. 1 is a view in side elevation of the device in collapsed position, certain portions being broken away and some portions shown in different positions in dotted lines;

Fig. 2 is a vertical section taken on line 2—2 of Fig. 1, as indicated by the arrows;

Fig. 3 is a horizontal section taken on the line 3—3 of Fig. 1, as indicated by the arrows;

Fig. 4 is a view similar to Fig. 3 showing the parts in different positions; and Fig. 5 is a plan view showing how a plurality of the decoys may be mounted and anchored.

Referring to the drawings, a decoy fowl is shown comprising a central frame or body portion 10. In the embodiment of the invention illustrated this body portion is of board-like form or shaped to simulate the shape of the fowl. Said body portion has a central opening 10ª of considerable extent therethrough. Open work side frame portions 11 are pivoted to the sides of the body 10 by means of the loops 11ª which are pivoted to the small bars or staples 12 secured in the sides of body portion 10. While the frame portions 11 may be variously formed in the embodiment of the invention illustrated they are shown as each comprising a plurality of wires or rods 11ᵇ which diverge from the loop ends 11ª, the inner members 11ᵇ being shown as extending in curved form between the loops 11ª and the outer members being shown as provided at one end with straight portions 11ᶜ extending substantially parallel to the side of body 10 for some distance rearwardly from the staple 12 and then extending in curved form to the loops 11ª at their other ends. One of the members 11ª being illustrated as the one adjacent the top member is formed with a loop 11ᵈ formed about the straight portion 11ᶜ of the top member 11ᵇ and these loops 11ᵈ of the members 11ᵇ are engaged by eyelets 13ª at one end of a curved yoke member 13 extending at each side of member 10, the bight portion of the yoke being provided with an eyelet 13ᵇ disposed centrally of body 10 and in the opening 10ª. The yoke 13 is guided through eyelets or staples 14 secured in the sides of body 10. A link member 15 has an eyelet at one end connected to eyelet 13ᵇ, said link member extending through an aperture in the clip guide bracket 16 secured to body 10 at the bottom of opening 10ª link 15 then extending upwardly diagonally and then horizontally and being pivotally connected by an eyelet at its other end to one end of an oscillating lever 17. Lever 17 is secured to a pivot member 18 extending vertically and centrally of the front portion of member 10 above opening 10ª. As shown in Figs. 3 and 4, the link 15 is provided with a curved substantially semi-circular portion 15$^a$ so as to embrace or pass around pivot 18 when in one position and also around a coiled compression spring 19 surrounding the pivot 18 and engaging at its ends respectively with lever 17 and a washer 20 held against the body 10. The upper member 11$^b$ has secured thereto a flexible member or cord 21, said cord extending downwardly and passing through an aperture 10$^c$ in the forward portion of body 10 and secured to the other end of lever 17. The members 11$^b$ are connected intermediate their ends by a tape 22 to which they are secured by stitching or otherwise and said members are covered by a fabric 23 such as water proof canvas. The canvas 23 is secured to the rods 11$^b$ in any suitable manner, the edges thereof preferably being folded over and stitched to the outermost rod or wire 11$^b$. The canvas is also secured at a plurality of places to the top of the body 10 as by the small tacks 23$^a$ shown in Fig. 1.

While various means might be provided for rotating the pivot member 18 and swinging the fabric covered frames 11, in the embodiment of the invention illustrated, the head 24 of the decoy is mounted to swing about pivot 18 and is secured thereto in any suitable manner, as by the pin 25. The head 24 is preferably provided with a plate 26 which may be of metal and engages the flat upper forward portion of body 10. Plate 26 has a depending lug 26$^a$ adapted to engage the side of body 10 and form a stop when the head 24 is in operative position. The head 24 is swingable through 180° the same being arranged to swing in a clockwise direction to move the frame members 11 to the position shown in dotted lines in Fig. 2 and in a counter-clockwise direction to move the frame members 11$^b$ upwardly so that they may assume the position shown in full lines in Fig. 2. It will be seen that when the head 24 is swung inwardly with the frame members 11 in their upper and collapsed position that the length of the decoy is considerably shortened and the head portion does not project where it will be apt to be struck and broken.

While the decoys may be mounted or supported in various ways in the embodiment of the invention illustrated, the members 10 are shown as pivoted to the vertical pivots 27, in the form of headed and nutted bolts, extending through the lower portion of body 10 and through a bar 28 shown as of rectangular form in cross section. Washers 29 preferably are disposed under the head and nut of pivot 27 and between members 10 and 28. As shown in Fig. 5, a plurality of bars 28, such as three of the same may be hinged together by the hinges 30, and these bars 28 can be held in diverging position by hook 31 secured to one of said bars and engaging an eyelet 32 on another of said bars. An anchoring rope 33 is connected to eyelet 34 secured in one of the bars 28.

In operation when the decoys are to be used the head 24 will be swung in a clockwise direction to the dotted line position, shown in Fig. 2. This movement turns the pivot 18 and oscillates lever 17. As shown in Fig. 4, this pulls upon link 15 and the flexible members 21, thus pulling downward on the members 11$^b$ and moving the same to the position shown in dotted lines in Fig. 2. The members 11$^b$ then follow or lie in the surface of the body of the fowl and a decoy is formed simulating very closely the actual wild fowl. The canvas covering 23 will be painted on its exterior to simulate the markings of wild ducks, geese or other fowl. The head and tail portion of body 10 will, of course, also be painted to simulate the wild fowl, so that a very accurate simulation of the wild fowl is produced. The decoys can be placed on the water with the bars 28 held as shown in Fig. 5 and anchored by the anchoring rope 33. When it is desired to pack and transport the decoys as when going to and from the hunting grounds, the hook 31 will be released so that bars 28 can be swung into parallel relation. The head member 24 is then turned inwardly in counterclockwise direction and this action pushes on the link 15 and yoke 13, swinging the open work frame members 11 with their canvas coverings upwardly. The frame members will then lie closely against the sides of the head 24 when placed thereagainst the decoys can be packed in flat condition, the width thereof being only slightly greater than the width of the body 10. The outer sides of the canvas coverings 23 are disposed inward so that they will not be scratched or damaged. The decoys can thus be placed in comparatively small space and easily and conveniently transported. The frame 10 being hollow or of open work construction and the wires 11$^b$ being quite small and the canvas 23 quite light there is little weight to the device. The spring 19 holds the head 24 and plate 26 downwardly so that it is in frictional engagement with the body 10. The decoys being pivoted to the bars 28, the body portions 10 and heads 24 will act as vanes so that the decoys will stand in one direction when the wind is blowing or when they are in the waves or in a current, as shown in Fig. 5. The wires 11$^b$ may be coated or painted to prevent corrosion.

From the above description it is seen that applicant has provided a very simple and efficient decoy and one which can be easily and quickly collapsed into a small space to be transported. The device is quite light in weight and is very easily manipulated so that it can be quickly placed in operative or inoperative position. The same has been amply demonstrated in actual practice and found to be very successful and efficient.

It will, of course, be understood that various changes may be made in the form, details, arrangement and proportions of the parts without departing from the scope of applicant's invention, which generally stated, consists in a device capable of carrying out the objects above set forth, such as disclosed and defined in the appended claims.

What is claimed is:

1. A decoy structure comprising a central vertically disposed comparatively flat frame, open work fabric covered frames pivoted to the sides of said frame, and means for swinging said open work frames downwardly and outwardly to operative position with the decoy in natural shape and for swinging said open work frames upwardly against the sides of said first mentioned frame in collapsed position.

2. A decoy structure having in combination a central vertically disposed comparatively narrow frame forming part of the body of the decoy, open work fabric covered frames pivoted at each side of said frame, and means comprising a portion of the body of said decoy oscillatable to swing said open work frames to operative position or to inoperative position against the sides of said first mentioned frame.

3. A decoy structure having in combination a central vertically disposed comparatively flat body portion simulating part of the fowl, open work fabric covered frames adapted to form the sides of the fowl pivoted at each side of said body, a head portion for the decoy pivoted to said body and means connecting said head and open work frames for swinging said open work frames to operative and inoperative position by the oscillating movement of said head.

4. A fowl decoy having in combination a central vertically disposed comparatively narrow frame portion, open work fabric covered frames pivoted at their ends to the sides of said frame respectively, a lever mounted on said frame, means connecting the ends of said lever to said open work frames respectively, a pivot connected to said lever and means for swinging said pivot to move said open work frames to operative or to collapsed position.

5. A decoy having in combination a central comparatively flat body portion forming part of the body of the decoy, open work fabric covered frames forming the sides of the decoy and pivoted at their ends to the sides of said frame, a yoke engaging one end of said open work frames, flexible means engaging the other end of said open work frame, a lever to which said yoke and flexible means are connected, and means for oscillating said lever to move said open work frames to operative and collapsed positions respectively.

6. A fowl decoy having a central body portion with a central opening, said body portion forming part of the body of said decoy, open work fabric covered frames pivoted to the sides of said body, means secured to the ends of said open work frames respectively for moving the same to operative and to collapsed positions, a swinging member having its ends connected to said means and a member forming part of the body of the decoy for moving said swinging member to move said open work frames to operative or inoperative position.

7. A fowl decoy having in combination a central comparatively flat body having a central opening therein, open work frames pivoted to the sides of said body at their end portions and having straight portions at one of their ends extending along said body, a yoke embracing said body and having its ends engaging said straight portions, a link connected to said yoke, a lever positioned in said opening, a pivot connected to said lever mounted in said body, a flexible means connecting the other ends of said open work frames, said link and last mentioned means being connected respectively to the ends of said lever and a head portion for said decoy connected to said pivot and adapted to be swung outwardly and inwardly respectively to move said open work frames to operative and inoperative position.

8. A decoy structure comprising a central comparatively flat rigid frame, open-work fabric-covered frames pivoted to each side of said rigid frame respectively adjacent the front and rear of said frame and adjacent the top thereof, said open-work frames being swingable upwardly about substantially horizontal axes to lie in substantially parallel relation to said rigid frame and being swingable downwardly about said axes to stationary positions and having convex surfaces in such positions and simulating the body of a fowl.

9. The structure set forth in claim 8, said rigid frame having the outline of a fowl's body as seen from the side, comprising a head portion, pivoted about a vertical axis and adapted to be turned rearwardly between said open-work frames when they are in their upward position.

In testimony whereof I affix my signature.

CHRIST D. EMOFF.